United States Patent
Leytus

(10) Patent No.: US 8,488,478 B1
(45) Date of Patent: Jul. 16, 2013

(54) METHOD AND DEVICE FOR ESTIMATING RF INTERFERENCE IN WI-FI COMMUNICATION BY MEASURING TIME DELAYS IN RF TRANSMISSION

(76) Inventor: Steven P. Leytus, Redmond, WA (US)

(*) Notice: Subject to any disclaimer, the term of this patent is extended or adjusted under 35 U.S.C. 154(b) by 887 days.

(21) Appl. No.: 11/958,536

(22) Filed: Dec. 18, 2007

Related U.S. Application Data

(60) Provisional application No. 60/956,617, filed on Aug. 17, 2007.

(51) Int. Cl.
 *H04J 1/16* (2006.01)
 *H04L 12/26* (2006.01)

(52) U.S. Cl.
 USPC .......................................................... 370/252

(58) Field of Classification Search
 USPC .......................................................... 370/252
 See application file for complete search history.

(56) References Cited

U.S. PATENT DOCUMENTS

| | | | |
|---|---|---|---|
| 6,377,608 B1 | 4/2002 | Zyren | |
| 6,763,483 B2 | 7/2004 | Penick | |
| 6,907,229 B2 | 6/2005 | Shpak | |
| 7,050,452 B2 | 5/2006 | Sugar | |
| 7,233,620 B2 | 6/2007 | Brommer | |
| 7,236,746 B2 | 6/2007 | Peric | |
| 7,245,595 B2 | 7/2007 | Kim | |
| 7,248,841 B2 | 7/2007 | Agee | |
| 2002/0099843 A1* | 7/2002 | Fruchtman et al. | 709/232 |
| 2003/0223390 A1* | 12/2003 | Huang et al. | 370/333 |
| 2004/0039817 A1* | 2/2004 | Lee et al. | 709/225 |
| 2004/0264425 A1* | 12/2004 | Nishikawa | 370/338 |
| 2005/0124347 A1* | 6/2005 | Hosein | 455/446 |
| 2007/0066315 A1* | 3/2007 | Kado | 455/445 |

OTHER PUBLICATIONS

Microsoft TechNet "How 802.11 Wireless Works" Mar. 28, 2003.*
The WifiSleuth 2.4 GHz WiFi Analyzer, http://www.nutsaboutnets.com/performance-wifi/products/product-wifisleuth-wifi-spectrum-analyzer.htm, by Nuts About Nets, LLC.
NetStumbler, http://www.netstumbler.com/ and http://www.netstumbler.org/.

* cited by examiner

*Primary Examiner* — Jason Mattis
*Assistant Examiner* — Stephen J Clawson
(74) *Attorney, Agent, or Firm* — Timothy E. Siegel Patent Law, PLLC; Timothy E. Siegel

(57) ABSTRACT

A device and method measures transmission efficiency of wireless RF energy packets for each 802.11 channel and relates these measurements to the presence of RF interference. The invention is implemented using a single computing device with an installed wireless network adapter that implements the CSMA/CA transmission protocol.

21 Claims, 5 Drawing Sheets

METHOD AND DEVICE FOR ESTIMATING RF INTERFERENCE IN WI-FI COMMUNICATION BY MEASURING TIME DELAYS IN RF TRANSMISSION

This application is derived from and claims the filing date of that provisional application filed Aug. 17, 2007 under Application No. 60/956,617.

BACKGROUND

1. Field of the Invention

The present invention relates to IEEE 802.11 wireless local area networks (WLANs). More particularly, the present invention relates to estimating radio frequency (RF) interference and determining the optimal channel or channels for use by an access point (AP) in an IEEE 802.11 WLAN.

2. Prior Art

IEEE 802.11 (Wi-Fi) wireless networks have grown in popularity in recent years and are found in business, industry and the home. Wi-Fi networks operate in the 2.4 GHz Industry, Scientific, and Medical (ISM) and 5 GHz Unlicensed National Information Infrastructure (U-NII) public bands that are unlicensed by the FCC. Many wireless devices compete for usage time in the public bands, and these devices transmit RF energy that introduce interference. The performance of WLANs that employ 802.11 network adapters are sensitive to interfering RF transmissions from other wireless sources, both 802.11 and non-802.11, which negatively impacts the performance of a wireless network.

An Access Point is an 802.11 device that serves as the central hub for a wireless network through which a station accesses a network. When an access point is installed and configured one chooses one of 11 (802.11b/g) or 12 (802.11a) Wi-Fi channels in which the access point will operate. The channel chosen can have a big impact on how well the network performs because of active and latent RF interference in the environment of the AP.

When installing a wireless network or troubleshooting one that performs poorly it is important to select a channel that is not subject to RF interference from other devices. With wireless systems it is difficult to predict the propagation of radio waves and to detect the presence of interfering signals without the use of test equipment. Typically an RF spectrum analyzer is the preferred tool for detecting and identifying sources of interference and for providing information that allows optimal configuration of a Wi-Fi network. There are also commercial devices designed to measure RF interference.

In general, their short-comings fall under two categories— either they do not employ an 802.11 device for measuring the effect of RF interference or they require multiple devices— e.g. an access point (AP) and wireless stations (STAB) —that are specially programmed to implement a custom protocol.

The WifiSleuth 2.4 GHz WiFi Analyzer (http://www.nutsaboutnets.com/performance-wifi/products/product-wifisleuth-wifi-spectrum-analyzer.htm) is developed and sold by Nuts About Nets, LLC, which is this inventor's company. This product is a 2.4 GHz spectrum analyzer that presents channel-centric views of RF data. It is not an 802.11 device and, therefore, may not truly reflect how 802.11 channels will perform in the particular environment where the measurements were taken.

Available 802.11 discovery tools such as NetStumbler (http://www.netstumbler.com/ and http://www.netstumbler.org/) and Wi-Fi scanners and locators do not give an accurate picture of channel performance because they do not see non-802.11 traffic. Also, though they can detect the presence of an 802.11 access point that is using a particular channel, they only report beacon strength and do not provide information related to channel performance, that is, how efficiently an RF energy packet with a digital payload will transmit in that channel. As a result they too (as with RF spectrum analyzers) are not reliable diagnostic tools for estimating channel performance or determining the optimal channel to be used for an AP. U.S. Pat. No. 6,985,465 issued to Gerard G Cervello, et al describes a method and system for selecting a IEEE 802.11 WLAN channel between an AP and a plurality of stations (STAB). This invention requires multiple 802.11 devices (i.e. at least one AP and several STAB) that are specially programmed to implement a custom protocol for negotiating and selecting which channel(s) to use.

U.S. Pat. No. 7,158,759 issued to Hansen, et al describes an AP that measures interference. When a threshold is exceeded it initiates an exchange with the STAB and negotiates a better channel to use. This invention also requires multiple 802.11 devices (i.e. at least one AP and several STAB) that are specially programmed to implement a custom protocol for negotiating and selecting which channel(s) to use.

U.S. Pat. No. 1,822,218 issued to Hongbing Gan describes an approach for selecting sets of channels that involves determining the performance of the channels. The participant identifies the selected set of channels and provides that data to other participants of the communications network who then communicate over the set of channels by using a frequency hopping protocol. This invention requires multiple 802.11 devices (i.e. at least one AP and several STAB) that are specially programmed to implement a custom protocol for negotiating and selecting which channel(s) to use. U.S. Pat. No. 7,110,322 Issued to Richa Malhotra, et al describes an algorithm for the assignment of channels used by APs in wireless LANs in a dynamic way to achieve the best performance. The assignment of channels is based on a procedure in which an AP is passively listening on the other channels during idle time and calculates the channel with the least interference and sharing. If the AP experiences too much disturbance on the channel it is using, it will decide to switch to the calculated optimal channel. This invention requires a specially programmed access point.

The primary object of the invention is to present a single device for use with a general purpose computer that can measure efficiency of transmission of energy packets in the various available RF channels for the ultimate purpose of selecting one or more channels for use by an AP.

SUMMARY

This object is achieved in a device and method for estimating RF interference in real-time by measuring the efficiency of RF transmission, or rate of data throughput, in channels of an 802.11-based wireless network (WLAN). The results then directly translate to how well a given channel will perform in a WLAN when used by an AP. Armed with this information, the optimal channel(s) can then be selected for the AP of interest. The system performs computations using the data it acquires and estimates in relative terms, typically as a percentage, the performance that can be expected when configuring an AP to use a particular channel, or the improved performance that can be expected when reconfiguring an AP to a new channel.

The basis of the invention is rooted in empirical observations that occurred while working on a 2.4 GHz signal/channel generator. The signal/channel generator is a unique, standalone application that transmits 802.11 energy packets on selected channels using an off-the-shelf 802.11 wireless adapter that doesn't require prior association with an access point. Though it is commonly thought that a wireless adapter must first associate with an access point or peer device before it can transmit data, which is generally the case, certain 802.11 chip sets can be programmed to transmit without being associated with an access point. Though rarely done, it was required for the signal/channel generator to function as a standalone device, that is, to function without first associating with another device.

The generator was being used in combination with a spectrum analyzer, the combination of which was new or at least unusual in the art. The generator was used to transmit 802.11 energy packets while the spectrum analyzer was used to receive the transmissions, which were displayed on the spectrum analyzer display. Thus "dead spots" could be located where RF energy was being absorbed by metal objects—either visible or part of a building's infrastructure. While monitoring the transmission of the signal/channel generator on a spectrum analyzer it was noticed that other wireless devices affected the display—that is, the pattern of 802.11 packet transmission and the amount of RF energy emitted by the transmitting device was dramatically affected by other wireless devices in the vicinity. This led to further experimentation and investigation and, ultimately, to the discovery that the generator could be adapted to measure and quantify the impact of RF interference on an 802.11 device.

Programmatically it is difficult to compute the true rate of wireless transmission because an operating system controlling the transmission buffers the output, which makes it impossible to get an accurate measurement of the negative effect of interfering RF energy on the transmission rate. It was only fortuitous that because a spectrum analyzer was being employed that the drop-off in 802.11 transmissions due to other wireless devices in the vicinity was seen in the spectrum analyzer display.

The sockets paradigm is the most common programming technique that applications use for transmitting data. However, that technique does not provide a mechanism for manipulating the wireless adapter—such as placing it in ad-hoc mode or changing the 802.11 channel. It was also fortuitous that an 802.11 wireless adapter was used that didn't require prior association with an access point.

Previously the preferred tool for detecting interfering RF energy was a spectrum analyzer, which only received RF energy. This disclosure teaches that an 802.11 device can also be programmed to perform RF interference diagnostics similar to what a spectrum analyzer might provide. It was not previously recognized that 802.11 adapters when used as transmitters of RF energy could be adapted to provide a powerful diagnostic tool. This will aid in trouble-shooting wireless communication problems and also help the user choose the best Wi-Fi channel for the user's particular environment and location.

As part of the 802.11 specification a collision avoidance protocol is used that is called CSMA/CA (Carrier Sense Multiple Access with Collision Avoidance). CSMA/CA is a transmission protocol designed to avoid collisions between multiple 802.11 devices transmitting at the same time and, as such, no one previously has extrapolated its use to include measuring RF interference. CSMA/CA belongs to a class of protocols called multiple access methods. With collision avoidance, if a wireless device or transceiver has information to transmit, it first listens for a predetermined amount of time to check for any activity (i.e. RF energy) on the channel. If the device determines the channel is idle, that is, available for use, it will then transmit. If the device determines the channel is busy, that is, not available for use, then it defers transmission. If the transceiver determines the channel is in use or busy it sets a timer with a wait value derived from a random number generator. When the wait time is completed the transceiver tries to transmit again by first listening for channel activity, as before. When there is no RF energy, it assumes the channel is clear, and transmits its information in an energy packet. Only in hindsight, one who is intimately familiar with the 802.11 specification and understands the CSMA/CA transmission protocol may recognize the advantages discovered and explain how this invention works and why it is a sound method for detecting interfering RF energy.

Different types of transmitters will create varying amounts of interference with the channel depending on their modulation method and RF output power. An analog transmitter will block the CSMA/CA device continuously if the signal strength is sufficient or intermittently near the edge of its frequency coverage area. Most devices in the 2.4 and 5 GHz range today are digital, and therefore use "bursty" packet transmission methods ("bursty" is commonly used in describing modulation methods used in cellular systems, PCS systems and other digital wireless communications systems). With bursty modulation methods, no RF energy leaves the antenna between packet transmissions. That's when an 802.11 transceiver sees an opportunity and transmits.

The present device and method transmits an energy packet of a given number of bytes and computes the time required for the transmission, which depends on RF interference in the channel, or the availability of a channel being measured. Software in the computer to which the device communicates tallies all of the transceiver's transmissions and compares this to a calibrated, pre-determined maximum value that is determined empirically in the absence of RF interference. This results in a '% Maximal Throughput' or '% Channel Availability' value for each channel. Because the transceiver is transmitting on the basis of detecting the presence or absence of RF energy, irrespective of modulation methods or protocols, it is able to give useful information regardless of what kinds of protocols, or how many protocols, are in use. In other words, because of the delay imposed by the CSMA/CA protocol fewer bytes are transmitted in the presence of RF interference. So, the extent to which the CSMA/CA protocol imposes delays in sending data is a direct reflection of interfering RF energy that it has detected on a particular channel.

The device estimates for each 802.11 channel the presence of RF interference by measuring the efficiency of channel transmission and throughput. It uses a single, off-the-shelf 802.11 wireless network adapter and does not require an AP though it can be implemented within an AP's embedded software. It can therefore be used as a stand-alone, test tool. The device comprises a wireless network adapter that is attached to a desktop, laptop or handheld PC (or another type of computing device with its own CPU and memory). The method performs a measurement of how long it takes to transmit a packet of known size and computes a throughput value in terms of bytes-per-second. The inverse relationship between this throughput value and the level of interfering RF energy allows one to derive a channel's performance. The measurement and computations are repeated over and over, providing a real-time result to the user. The test system includes graphical capabilities to graphically display test results.

Because the system employs an 802.11 device to collect data, then the results truly reflect how RF interference in the local environment will affect 802.11 channels, which is not possible using an RF spectrum analyzer. An RF spectrum analyzer is a more primitive device that reports signal strength as a function of frequency. It does not take into account the overlap of 802.11 channels nor the robust protocols that are built into the 802.11 standard. When using an RF spectrum analyzer it is left to the user to interpret the data and determine which is the optimal channel—and without intimate knowledge of the inner-workings of 802.11 the user will often be misled and arrive at the wrong conclusion. Also, the system and method inherently take into account interference from both 802.11 and non-802.11 sources and hence provides more information and is more accurate than an 802.11 discovery tool or Wi-Fi scanner.

In operation one installs an 802.11 wireless network adapter in a laptop, desktop or handheld computer (or, perhaps, a proprietary computing device). An adapter that supports the 802.11 standard is ideal because these are inexpensive, widely available, and implement CSMA/CA as part of their transmission protocol. In theory, any 802.11 wireless device that implements a CSMA/CA transmission protocol could be used.

Because levels of RF energy in the 802.11 frequency space are not constant and vary over time, results may fluctuate. The software therefore accepts user input for selecting which channel(s) to test or automatically cycles through all the available channels and tests each one in turn. When the user is satisfied the measurements have stabilized then testing is halted. Armed with the results the user knows which channel(s) will provide optimal performance at least at the measured time and can configure an access point accordingly.

The device and method also could be used to quantify a metric that would give the user an idea of how much better their AP would perform if a different channel were used. For example, the invention could provide to the user a '% Improved Performance' metric for each channel—a valuable estimate for the user who needs to decide whether or not it is worth the time and investment to reconfigure the infrastructure of their WLAN.

DETAILED DESCRIPTION OF THE PREFERRED EMBODIMENTS

Figure 1:
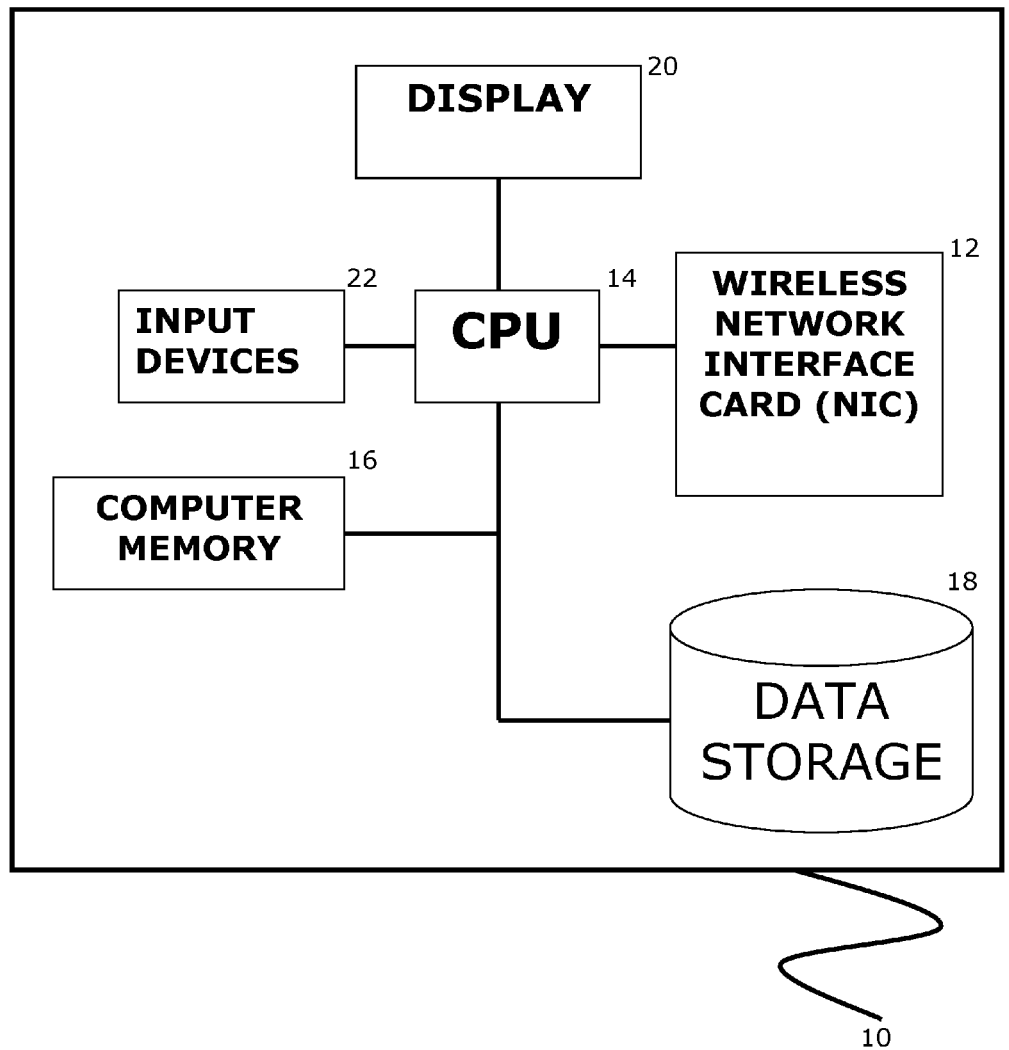
FIG. 1 is a block diagram illustrating elements of the standalone test tool of the present invention for an 802.11 wireless network.

With reference to FIG. 1, a test tool 10 that implements the system and method of the present invention includes an 802.11 wireless network interface card (NIC) 12 coupled to an antenna. The wireless NIC 12 is embodied as an IEEE 802.11 transceiver designed to send and receive signals in a frequency range corresponding to the WLAN's operation type (e.g. 2.4 GHz frequency range for IEEE 802.11b/g and 5 GHz frequency range for 802.11a). The test tool 10 employs a suitable computing environment having a processor 14 to communicate with the wireless network adapter 12, for example to send commands and send and receive data. In the normal manner, computer memory 16 and data storage 18 devices are included to provide temporary and permanent storage, respectively, of information required by the computing system as is a display unit 20 so that results can be displayed, generally in graphic form, of each channel's performance. Also in normal manner, the computer system includes any of several available input devices 22 such as a keyboard, mouse, touch screen and the like through which a user can control the tool 10 and navigate software loaded into the computer system and access data and results acquired by the tool 10. The tool 10 and the computing system environment is only one example of a suitable computing environment and is not intended to suggest any limitation as to the scope of use or functionality of the invention. Furthermore the invention is operational with other general purpose or special purpose computing system environments or configurations. Examples include, but are not limited to: personal computers, hand-held or laptop devices, tablet devices, programmable consumer electronics, network PCs, 802.11 wireless adapters and 802.11 access points.

Figure 2:
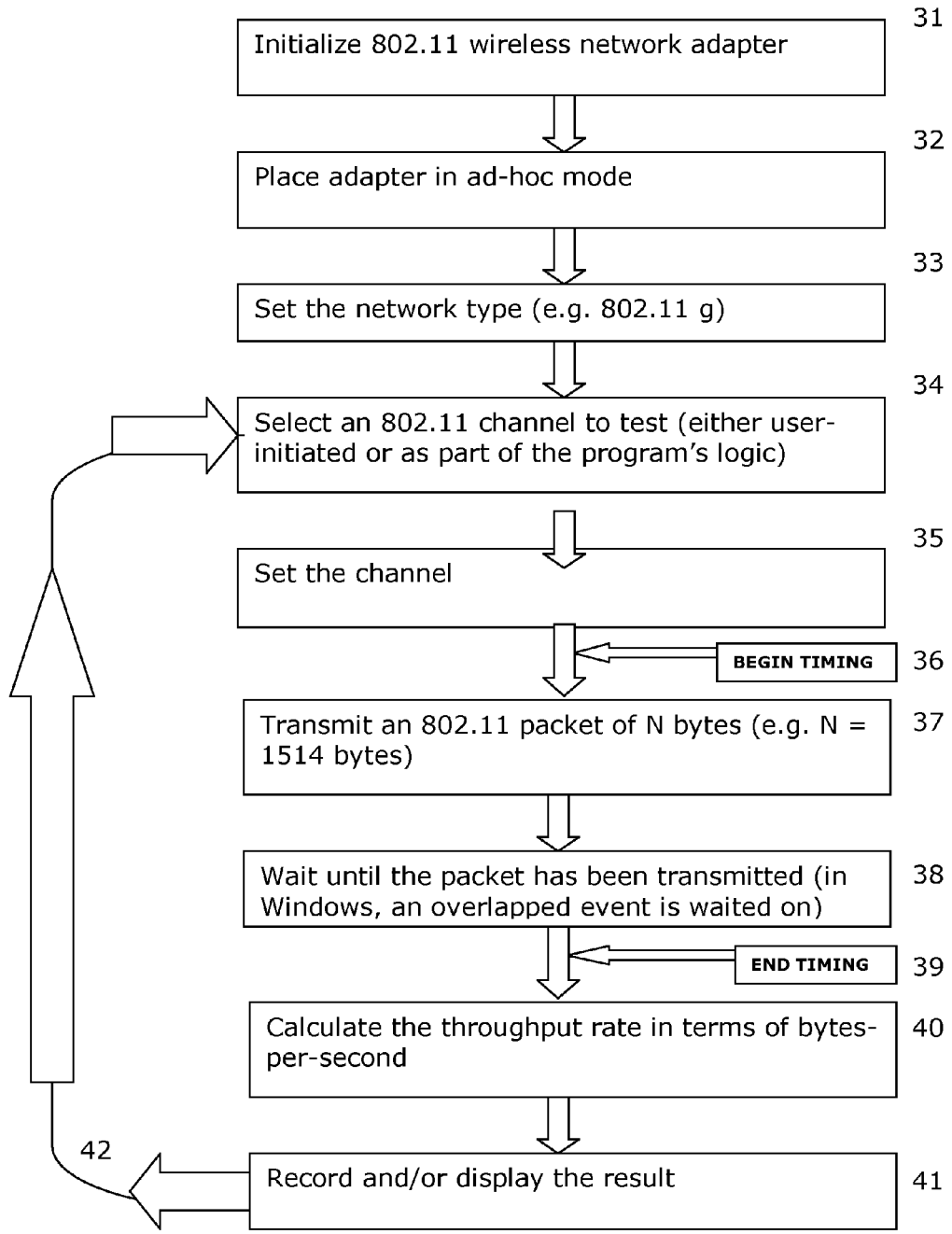
FIG. 2 is a flowchart of the method of the present invention of estimating RF interference by measuring the efficiency of channel transmission and throughput.

The method of the present invention of estimating RF interference by measuring the efficiency of channel transmission and throughput is illustrated in the flowchart of FIG. 2, which is implemented in the software. The computing environment assumed by FIG. 2 is a typical mobile computer where the attached wireless NIC 12 may be a PC Card, USB adapter or mini, built-in, peripheral card functionally equivalent to an 802.11 wireless network adapter. In practice, the method can be implemented by any computing environment that includes a processor, memory and 802.11 wireless NIC. The computer is loaded with communication, control and reporting software and then in step 31 the wireless network adapter 12 is initialized to establish logical communication between the processor 14 and the wireless network adapter 12 such that the adapter 12 receives commands from the processor 14 and the processor 14 and adapter 12 exchange data under control of the software.

An 802.11 wireless network can run in two different modes. Infrastructure mode (also known as extended service set, ESS, mode) is most common. In ESS mode an access point acts as a bridge between a wired network and wireless client stations. "Ad-hoc" mode, also known as independent basic service set, IBSS network mode, is used for peer-to-peer networking between wireless stations and does not use an access point. In step 32 the adapter is issued a command to place it in ad-hoc mode. In step 33 the adapter is issued a command to set the network type to 802.11a (also known as OFDM5), 802.11b (also known as DSSS) or 802.11g (also known as OFDM24). In general the method does not depend on which network type is used. In step 34 a channel is selected either by the user or by the software and then, in step 35, the adapter 12 is issued a command to set that channel, that is, to begin using that channel for transmitting 802.11 RF energy packets. The range of channels that are available varies depending on the country in which the wireless network adapter is used and also the network type (802.11a/b/g). For purposes in describing this invention, an 802.11g network type operating in the United States is assumed. In this case a choice of 11 channels is used, simply numbered 1 through 11. Step 36 is the point at which the method begins keeping track of time. In step 37 the adapter 12 is issued a command to transmit an 802.11 packet with a payload of a given number of bytes, N. The value of N is not critical, but it has been empirically determined that values between 1000-1514 bytes work well. In step 38 the software application waits until the adapter 12 has completed the transmission. Delays in transmission will typically occur due to interfering RF energy. The CSMA/CA protocol implemented in the adapter 12 will allow transmission only when there is an opportunity made available by a break in the RF interference. The software measures delays in transmission which is then directly related to the amount of RF interference. When the packet has finished being transmitted the software stops timing in step 39 and acquires the elapsed time required to transmit the 802.11 packet along with its payload. In step 40, a throughput rate is calculated as bytes per second (i.e. N bytes/elapsed time). The throughput rate can be compared in real-time to a pre-determined reference value, such as a maximum transmitted bytes-per-second that is empirically determined for a particular wireless network adapter in an environment that is known to be void of any other wireless devices and RF interference. The resultant real-time transmitted bytes-per-second is a percent of the maximum, which then is roughly the percent of channel performance that remains after taking into account interfering RF energy. In step 41, the resultant statistics are recorded and/or displayed to the user. And finally, in step 42 the software loops around and returns to step 34 to repeat the measurement either using the same channel or a different channel depending upon user input or the software's logic. The measurements are recorded in data storage 18 as a function of time.

Figure 3:
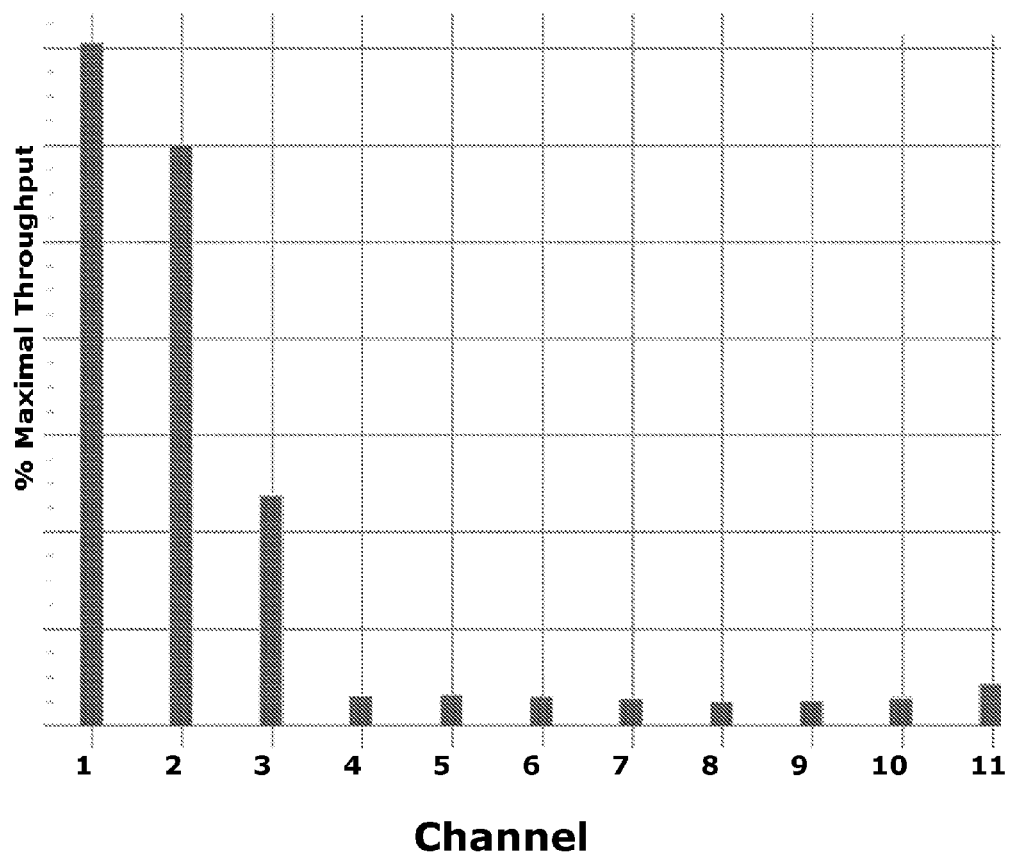
FIG. 3 is a computer display of a graphical presentation of results obtained by testing all 11 802.11 channels, with the channels on the x-axis and the '% Maximal Throughput' on the y-axis. Optionally, the channels are sorted from best-performing to worst-performing (left-to-right on the display).

In FIG. 3 results of a measurement is graphed to show the Percent Maximal Throughput of each channel that is tested. This graph can be repeatedly updated in real time. The larger the y-value of a channel the better will be the performance of the access point if it is configured to use that channel. To aid the user in determining the best channel, the channels can be sorted according to their y-values.

Figure 4:
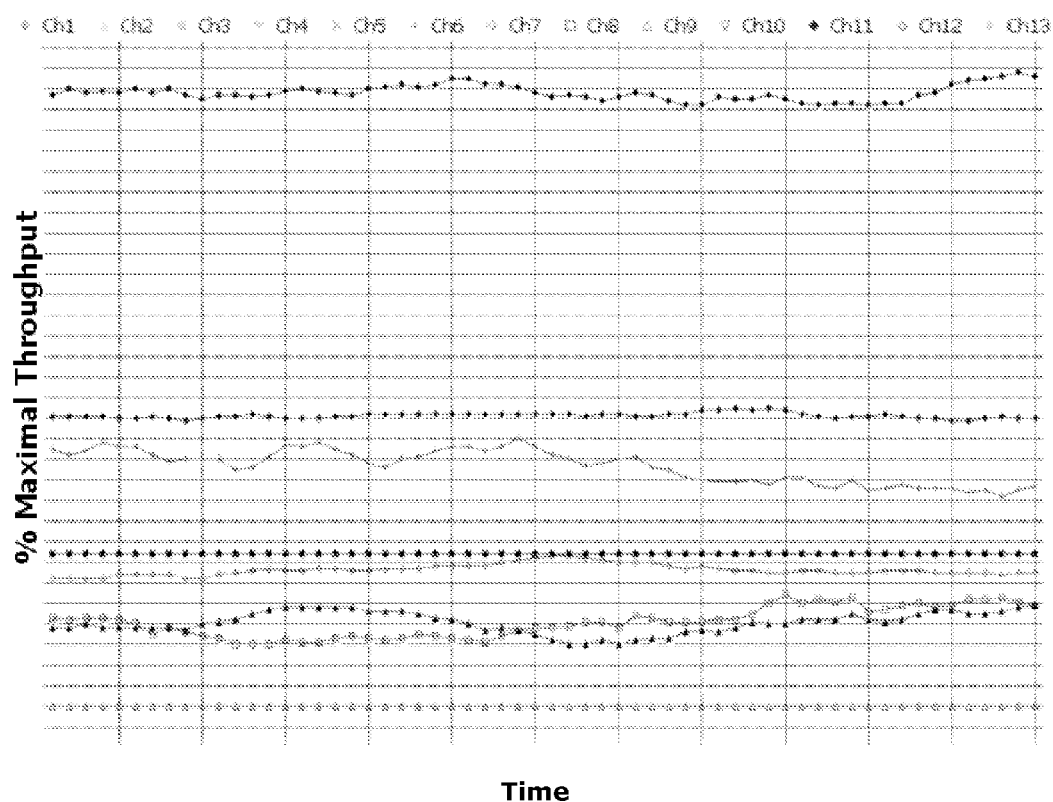
FIG. 4 is a computer display of a graphical presentation of results of FIG. 3 shown over time.

In FIG. 4 the results of a measurement are graphed to show the Percent Maximal Throughput of each channel as a function of time. Since the pattern of interfering RF energy in the local air space often changes with time, then it is useful for the user to see how this would affect the different channels.

Figure 5:
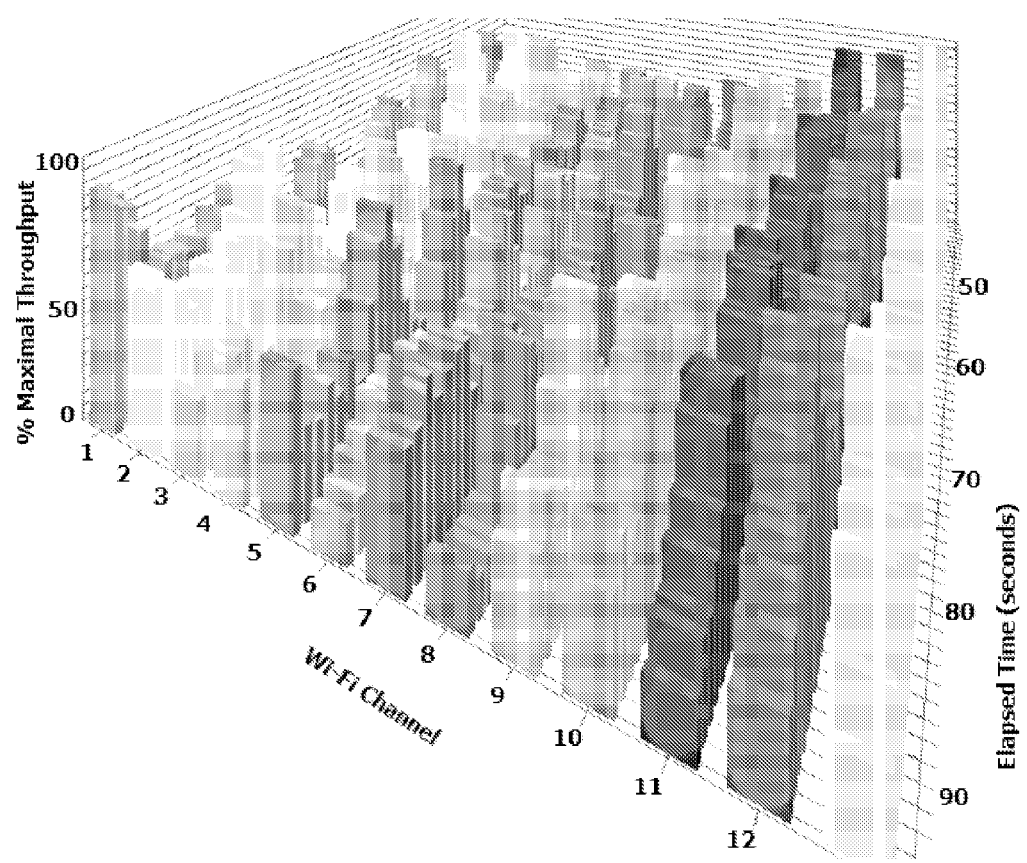
FIG. 5 is a three dimensional display of the data of FIG. 4.

In FIG. 5 a graph of a channel spectrogram is shown that combines FIG. 3 and FIG. 4 to show the Percent Maximal Throughput as a function of channel and time, providing a visual display to the user on the computer display that is easy for a user to understand and interpret.

It is to be understood that although the description herein provides an 802.11 wireless adapter and a computer with software, at least a portion of the software can be implemented within any 802.11 wireless device (that is, station or access point) that includes a processor and software programmed in the device. Similarly, at least a portion of the functions of the computer may be implemented in the adapter. The descriptions herein are deemed to include these alternative embodiments.

While the foregoing written description of the invention enables one of ordinary skill to make and use what is considered presently to be the best mode thereof, those of ordinary skill will understand and appreciate the existence of variations, combinations, and equivalents of the specific embodiment, method and examples herein. The invention should therefore not be limited by the above described embodiment, method and examples, but by all embodiments and methods within the scope and spirit of the invention as claimed.

The invention claimed is:

1. A method for picking an efficient-transmission RF channel from a plurality of RF channels available for 802.11 protocol communications, comprising:

(a) performing a first transmission of a sequence of bits in 802.11 protocol, on a first one of said 802.11 RF channels, without establishing communication to another 802.11 device on said first channel, and determining the time needed to complete said transmission;

(b) performing a second transmission of a sequence of bits in 802.11 protocol, on a second one of said 802.11 RF channels, without establishing communication to another 802.11 device on said second channel, and determining the time needed to complete said second transmission; and (c) comparing the bit transmission rate of said first transmission to said bit transmission rate of said second transmission and choosing the channel on which the transmission having the higher bit transmission rate was performed.

2. The method of claim 1, wherein said 802.11 protocol is more specifically 802.11(a) protocol.

3. The method of claim 1, wherein said 802.11 protocol is more specifically 802.11(b) protocol.

4. The method of claim 1, wherein said 802.11 protocol is more specifically 802.11(g) protocol.

5. The method of claim 1, wherein an identical length sequence of bits is transmitted on said first channel and on said second channel, and wherein said comparison of bit transmission rates is performed by comparing the time to complete said transmission on said first channel with said time to complete said transmission on said second channel.

6. The method of claim 5, wherein said sequence of bits transmitted on said second channel is identical to said sequence of bits transmitted on said first channel.

7. The method of claim 1, wherein bit transmission rates are computed for said first channel transmission and said second channel transmission.

8. The method of claim 1, wherein said transmission is performed by an 802.11 wireless adapter connected to and commanded by a computer.

9. The method of claim 1, wherein said transmissions are performed by an 802.11 wireless device having processor readable, non-transitory memory and wherein said memory has a computer program implementing the method of claim 1.

10. The method of claim 1, further including transmission a sequence of bits and making a comparison of bit transmission rate between at least one additional 802.11 RF channel and said transmission rates of said first and second RF channels.

11. Computer readable, non-transitory media having a computer program that when installed on a computer having an attached 802.11 protocol wireless adapter, causes said computer to perform a method for picking an efficient-transmission RF channel from a plurality of RF channels available for 802.11 protocol communications, comprising:

(a) performing a first transmission of a sequence of bits in 802.11 protocol, on a first one of said 802.11 RF channels, without establishing communication to another 802.11 device on said first channel, and determining the time needed to complete said first transmission;

(b) performing a second transmission of a sequence of bits in 802.11 protocol, on a second one of said 802.11 RF channels, without establishing communication to another 802.11 device on said second channel, and determining the time needed to complete said second transmission; and (c) comparing the bit transmission rate of said first transmission to said bit transmission rate of said second transmission and choosing the channel on which the transmission having the higher bit transmission rate was performed.

12. The media of claim 11, wherein an identical length sequence of bits is transmitted on said first channel and on said second channel, and wherein said comparison of bit transmission rates is performed by comparing the time to complete said transmission on said first channel with said time to complete said transmission on said second channel.

13. The media of claim 11, wherein said sequence of bits transmitted on said second channel is identical to said sequence of bits transmitted on said first channel.

14. The media of claim 11, wherein bit transmission rates are computed for said first channel transmission and said second channel transmission.

15. The media of claim 11, wherein said computer program further transmits a sequence of bits and makes a comparison of bit transmission rate between at least one additional 802.11 RF channel and said transmission rates of said first and second RF channels.

16. An 802.11 protocol wireless device that picks an efficient-transmission RF channel from a plurality of RF channels available for 802.11 protocol communications by performing a method, comprising:
  (a) performing a first transmission of a sequence of bits in 802.11 protocol, on a first one of said 802.11 RF channels, without establishing communication to another 802.11 device on said first channel, and determining the time needed to complete said transmission;
  (b) performing a second transmission of a sequence of bits in 802.11 protocol, on a second one of said 802.11 RF channels, without establishing communication to another 802.11 device on said second channel, and determining the time needed to complete said second transmission; and
  (c) comparing the bit transmission rate of said first transmission to said bit transmission rate of said second transmission and choosing the channel on which the transmission having the higher bit transmission rate was performed.

17. The device of claim 16, wherein an identical length sequence of bits is transmitted on said first channel and on said second channel, and wherein said comparison of bit transmission rates is performed by comparing the time to complete said transmission on said first channel with said time to complete said transmission on said second channel.

18. The device of claim 16, wherein said sequence of bits transmitted on said second channel is identical to said sequence of bits transmitted on said first channel.

19. The device of claim 16, wherein said computer program further transmits a sequence of bits and makes a comparison of bit transmission rate between at least one additional 802.11 RF channel and said transmission rates of said first and second RF channels.

20. A method for picking an efficient-transmission RF channel from a plurality of RF channels available for 802.11 protocol communications, comprising:
  (a) performing a first transmission of a sequence of bits in 802.11 protocol, on a first one of said 802.11 RF channels, without associating to another 802.11 device on said first channel, and determining the time needed to complete said transmission;
  (b) performing a second transmission of a sequence of bits in 802.11 protocol, on a second one of said 802.11 RF channels, without associating to another 802.11 device on said second channel, and determining the time needed to complete said second transmission; and
  (c) comparing the bit transmission rate of said first transmission to said bit transmission rate of said second transmission and choosing the channel on which the transmission having the higher bit transmission rate was performed.

21. A method for picking an efficient-transmission RF channel from a plurality of RF channels available for 802.11 protocol communications, comprising:
  (a) performing a first transmission of a sequence of bits in 802.11 protocol, on a first one of said 802.11 RF channels, without interacting with another 802.11 device on said first channel, and determining the time needed to complete said transmission;
  (b) performing a second transmission of a sequence of bits in 802.11 protocol, on a second one of said 802.11 RF channels, without interacting with another 802.11 device on said second channel, and determining the time needed to complete said second transmission; and
  (c) comparing the bit transmission rate of said first transmission to said bit transmission rate of said second transmission and choosing the channel on which the transmission having the higher bit transmission rate was performed.

* * * * *

UNITED STATES PATENT AND TRADEMARK OFFICE
CERTIFICATE OF CORRECTION

PATENT NO. : 8,488,478 B1
APPLICATION NO. : 11/958536
DATED : July 16, 2013
INVENTOR(S) : Leytus Page 1 of 1

It is certified that error appears in the above-identified patent and that said Letters Patent is hereby corrected as shown below:

In the Claims:

In Column 8, in Claim 1 (a), in Line 2, the word --first-- should be inserted between the words "said" and "transmission"

In Column 8, in Claim 10, bridging lines 39 and 40, the word --of-- should be inserted between the words "transmission" and "a"

Signed and Sealed this
Seventeenth Day of December, 2013

Margaret A. Focarino
*Commissioner for Patents of the United States Patent and Trademark Office*